United States Patent [19]
Lawrence

[11] Patent Number: 5,820,037
[45] Date of Patent: Oct. 13, 1998

[54] PORTABLE AUTOMOBILE UNDERCARRIAGE WASHER

[76] Inventor: John S. Lawrence, PO Box 41, Kemblesville, Pa. 19347

[21] Appl. No.: 798,437

[22] Filed: Feb. 10, 1997

[51] Int. Cl.$^6$ ........................................................ B08B 3/02
[52] U.S. Cl. ............................ 239/722; 134/123; 239/754
[58] Field of Search ...................................... 134/123, 172; 239/722, 754

[56] References Cited

U.S. PATENT DOCUMENTS

| | | | |
|---|---|---|---|
| 4,580,726 | 4/1986 | Unger | 239/722 |
| 4,984,746 | 1/1991 | Joyal | 134/123 X |

*Primary Examiner*—Philip R. Coe

[57] ABSTRACT

A portable automobile undercarriage washing/cleaning device consisting of an inverted bowl-like body portion featuring a water spray nozzle on the top face and a connection for a rigid, non-flexible water pipe on the side of the body, the water pipe ending in a water control valve, and casters underneath of the body and attached to the body, which when all of the components are connected together and secured to a standard garden-type hose, results in a pressurized water spray pattern capable of being delivered to the undercarriage of an automobile, or other wheeled vehicle, the pressurized water spray being used to remove accumulated mud or road salt from the undercarriage of the vehicle, which was deposited on the undercarriage of the vehicle under normal driving conditions on debris-ladened readways and effecting the rapid removal of the debris from the undercarriage and its related structural members.

4 Claims, 2 Drawing Sheets

PORTABLE AUTOMOBILE UNDERCARRIAGE WASHER

BACKGROUND OF THE INVENTION

The invention relates to washing devices, and in particular to a device that is capable of washing road debris consisting of road salt, mud, etc. from the under portion of an automobile or truck or other wheeled vehicle.

In various seasons of the year, the roadways that are in common useage by motor vehicles, in particular, are subject to a variety of accumulated debris that results from either naturally occurring substances such as mud after a rain or road salt that is applied to the roadway in order to melt ice and snow accumulations as a result of freezing precipitation. It is a common occurrence that this debris tends to accumulate on the vehicle in such a manner that removal via washing is necessary in order to preserve the finish or paint of the vehicle. The greatest accumulation of this potentially harmful debris is underneath of the vehicle, around the frame, undercarriage and wheel wells, etc. If not promptly removed, it is well known that such substances as mud and road salt can lead to severe deterioration of the paint finish or protective undercoating of a vehicle and this protective layer having been breeched, the supporting metal underneath of the paint is subject to rust, rapid deterioration, and eventual failure.

Due to the cost involved in the purchase and maintenance of a vehicle such as an automobile, it is well worth the time and small cost to wash away all of the accumulated road debris as soon as possible in order to preserve the coatings that protect the structural metal parts that are subject to corrosion by accumulated road debris such as mud or road salt. A simple washing with water is, at most times, sufficient to remove the majority of the debris and a subsequent soap and water wash would remove the remaining material on the top and sides of the vehicle. However, it is the undercarriage of the automobile or other vehicle that is most likely to have the majority of un-washed surfaces and significant accumulation of remaining debris, even after a conventional washing. This fact is borne out by the great number of vehicles that have rusted undercarriage components that lead to rapid failure of the supporting structure of the vehicle or a significant loss in value of the vehicle due to large rusted-out areas in the undercarriage. It is well known that an automobile that has been well maintained is worth far more than one that has little or no maintenance.

One solution to the problem of reaching and cleansing the undercarriage of an automobile or other vehicle is to drive the vehicle into a whole-car car washing device. These machines have various spray mechanisms at various angles to reach every surface of the said vehicle and are capable of rapidly and thoroughly cleansing the entire vehicle and in particular, the undercarriage. However, not only is there significant expense associated with the average commercial car-wash on a one-time basis, but in times of large amounts of rain or snow and resulting large amounts of mud or road salt on the roadway, it may become necessary to wash the vehicle very frequently, resulting in a large expense of time as well as money. In addition, the vehicle owner may live in an area inaccessible to a commercial car-wash facility. Under such circumstances, it would be most advisable and economical for the vehicle owner to have a device capable of cleansing the undercarriage of their vehicle at a convenient location, such as their place of residence. In this manner, it is then possible for the vehicle owner to cleanse the undercarriage of their automobile at their convenience with very, very little time wasted and at low expense.

It is the object of the invention to provide a simple, readily available device that is capable of cleansing the undercarriage of a vehicle from accumulated mud or road salt with a water spray and thus preserving the underlying structural members of the vehicle from the damaging effects resultant from unremoved mud or salt accumulations.

Another object of the invention is to provide such as device that is capable of cleansing the undercarriage of a vehicle to be readily adaptable to a conventional supply of water such as a faucet and garden hose extension and to be connected to the said water supply and/or extension hose with standard connections.

SUMMARY OF THE INVENTION

In a preferred embodiment, the invention consists of a number of interrelated pieces that when joined together, form a body which is essentially a round, inverted bowl-like shape with a slightly domed top portion. The body features a spray nozzle protruding from the top portion, which is itself screwed into a threaded hole in the top of the body. This spray nozzle, when having a water source under pressure connected to it, is capable of emitting a large fan-shaped spray pattern, sufficient to impact the undercarriage of a vehicle with a stream of water that will effect a cleaning action against the painted surfaces of the said undercarriage and the removal of debris, such as mud or road salt, that may have accumulated on the undercarriage members under normal driving conditions on muddy or salt-ladened roadways. As mentioned, the spray nozzle end threads are screwed into threads that are a part of a tube-shaped structure within the body of the invention. This tube-like structure consists of an aperture of approximately ¼ inch in diameter at the nozzle exit end, then, running down to an approximate right angle, still at the same diameter, the tube flares out to become approximately a ¾ inch diameter at the time of exit from the body of the invention. At this exit, the tube-like structure again features a threaded integral end which is capable of receiving a standard-sized ¾ inch diameter connector which consists of a male threaded portion attached onto a movable ring-like threaded structure, such as is found on a standard hose connection, which acts as a female connector for a ¾ inch treaded pipe ending to be fitted into the movable ring-like female portion of the connector in order to securely attach the pipe to the main body of the invention. Subsequently, the pipe that has been so connected, extends out from the body approximately 20 inches in a straight line course and then gently bends at an approximate 45 to 55 degree angle and continues for approximately another 30 inches to be then connected to a water control valve device that is capable of regulating the inflow of water, under pressure, whose source is a connecting standard garden hose or the like, which is itself connected to a convenient standard residential-type exterior faucet. The water control valve device has a handle that easily facilitates the turning on an off of the water supply and is detachable, via a threaded end from the main body of the connecting pipe which extends from the body of the invention.

The body of the invention, in addition to the spray nozzle, interior tube-like structure and its connecting pipe end feature, consists of a base plate in an approximately round shape, having a series of holes in which a connecting threaded screw passes through at each of four hole locations placed in an approximately square pattern within the outer confines of the base plate. When the screws are passed through these holes, they go on into a prepared threaded channel in the body and are then tightened, securing the base plate to the body. In addition, the base plate features at least one, preferably two holes, through which a caster or casters are attached and secured via screws, to the base plate allowing the body of the invention to be conveniently moved around under the undercarriage of the vehicle in any horizontal direction. This allows the operator the ability to direct the water spray pattern in such a manner so as to clean the members of the undercarriage of a vehicle in a very convenient and rapid manner.

DETAILED DESCRIPTION OF THE INVENTION

Figure 1:
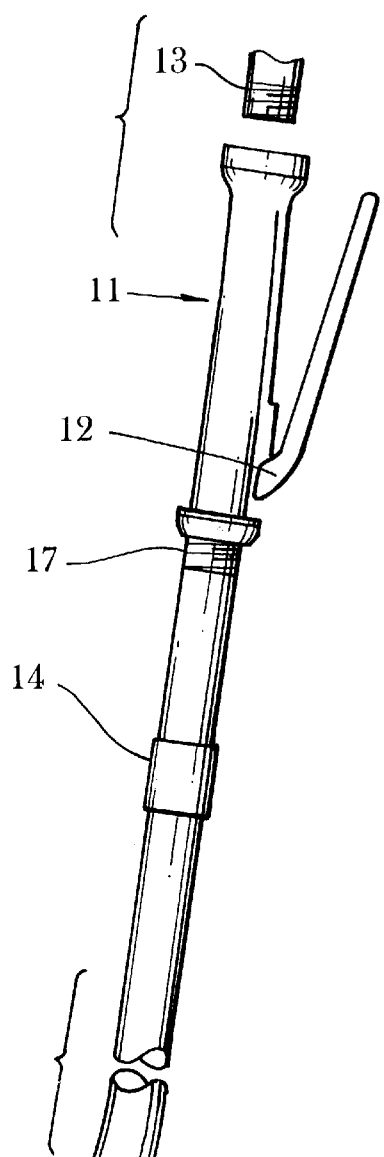
FIG. 1 is a perspective view of the illustrative embodiment of this invention.

As shown in FIG. 1, an illustrative embodiment of the vehicle undercarriage washer/cleaner comprises a base plate 1 attached to a body 9 via at lease four screws 18 passing through holes into a channel in order to secure the base plate to the body of the invention. In addition, casters 4 pass through holes and attach to base plate 1 with screws, which is then attached to the main body 9 as explained, in order to provide convenient horizontal movement of the body 9 by the operator via a rigid, non-flexible water pipe 10 which itself attached to the body 9 by a connnector 8 which features a movable threaded circular female portion to which the rigid pipe is attached via standard threads onto the male threads of the pipe. In addition, the connector 8 features a small male extension which is attached to the movable threaded portion of the connector as is commonly found in a standard hose connector. This male portion of connector 8 is screwed into the threaded water outlet in the body 9. The threaded water outlet is an integral part of the tube-like structure which is found in the interior of the body 9 and provides a connection for water passage from pipe 10 to nozzle 5 via a reduction in diameter from the ¾ inch opening of the tube-like structure to the opposite end threaded diameter of ¼ inch to which a removable nozzle 5 is screwed into place. The reduction in diameter is necessary in order to accommodate a standard ¾ inch pipe, which carries the water to the body 9, and provide a continuous path of water to the threaded nozzle 5. Also, by compressing a larger volume of water from the ¾ inch pipe into the smaller diameter ¼ inch nozzle thread attachment area, the pressure effect increases when the water is released from the nozzle opening. The rigid, non-flexible pipe which is ¾ inch in diameter then passes from the body 9 via the connector 8 in a straight path away from the body 9 for approximately a distance of 20 inches and then via a gentle bend in the pipe of approximately 45 to 55 degrees for an additional distance of approximately 30 inches. This allows the body 9 of the invention to pass conveniently under the undercarriage portion of a typical motor vehicle for approximately a coverage of ½ of the area of the undercarriage to be cleaned via a water spray from nozzle 5. The overall dimension of the body 9 features a diameter of approximately 6 inches and a height of approximately 3 inches. The casters, which are affixed onto the base plate 1 add an additional approximate 2 inches to the overall height of the body 9. The approximate shape of the body 9 is an inverted bowl-like structure, having a slightly domed top in order to repel water. It would be possible to construct the body portion of the invention in order to feature an axle attached to the base plate and two wheels protruding from the body, rather than casters.

The connecting water pipe 10 has a gentle angle bend of approximately 45 to 55 degrees in order to bring the terminus of the pipe within the easy reach of the operator. The pipe could be made in two sections, featuring a slightly smaller than ¾ inch diameter piece extending from the body 9 to and fitting into the other section, allowing for some adjustment to overall length or for more ease of storage when the cleaner is not in use. In such an instance, an adjustable compression collar 14 could be featured on the second, larger section of the pipe in order, when tightened, would provide a water tight seal between sections of the pipe.

The connecting water pipe has its terminus in a female end featuring circumferential standard hose type threads. A movable ring as is commonly found on a hose connection connects the water control valve to the water pipe. A hand operated water control valve 11, featuring a standard on/off piston operated by a lever 12 is connected to the water pipe 10 for regulation of the water from the standard ¾ inch diameter garden-type hose 13.

Figure 2:
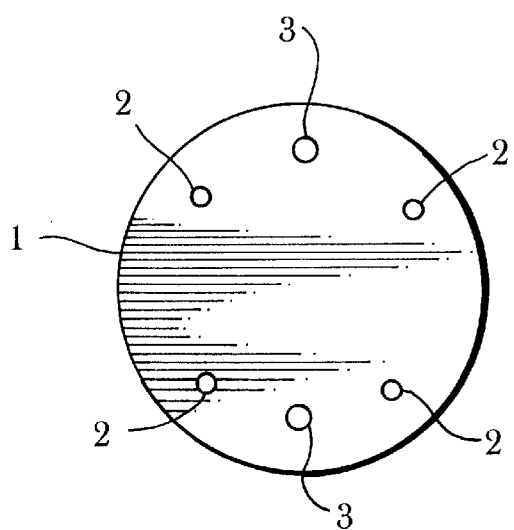
FIG. 2 is a view of the base plate as shown in FIG. 1
Figure 2:
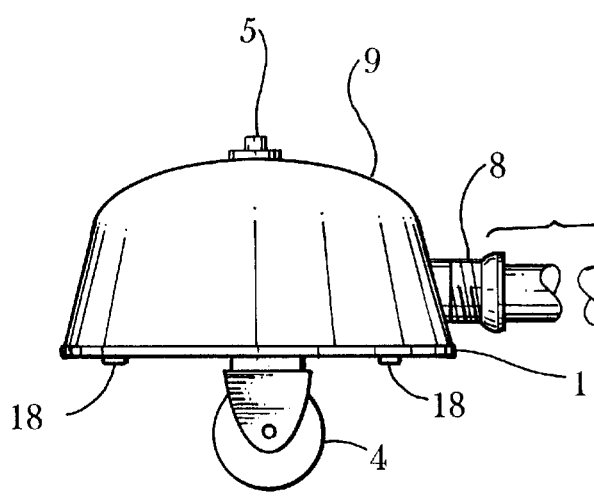
Figure 3:
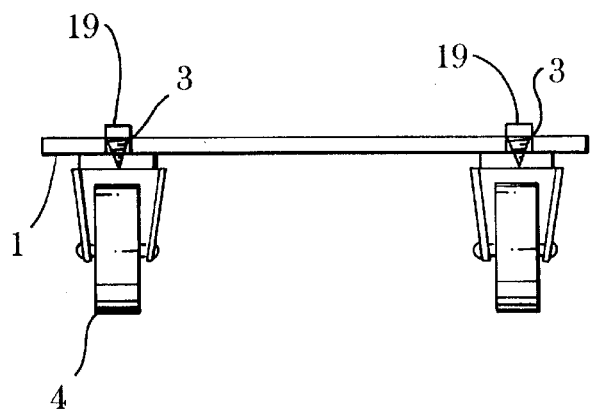
FIG. 3 is a view of the base plate as is shown in FIG. 2 with attached casters
Figure 4:
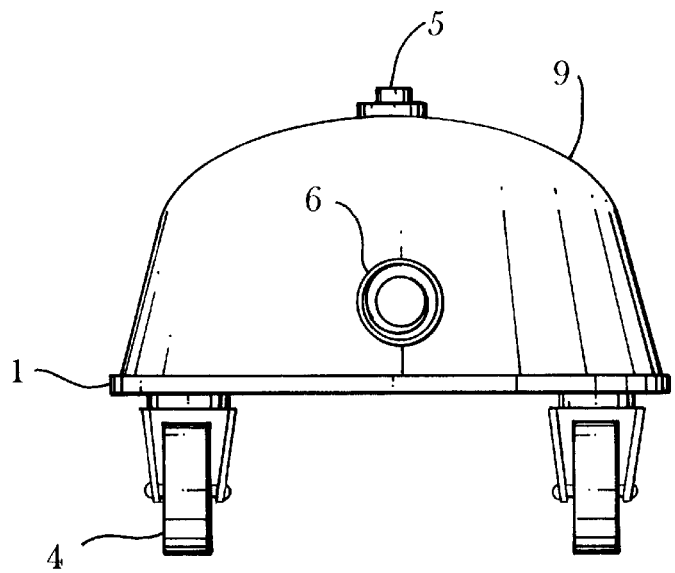
FIG. 4 is a front view of the body as shown in FIG. 1
Figure 5:
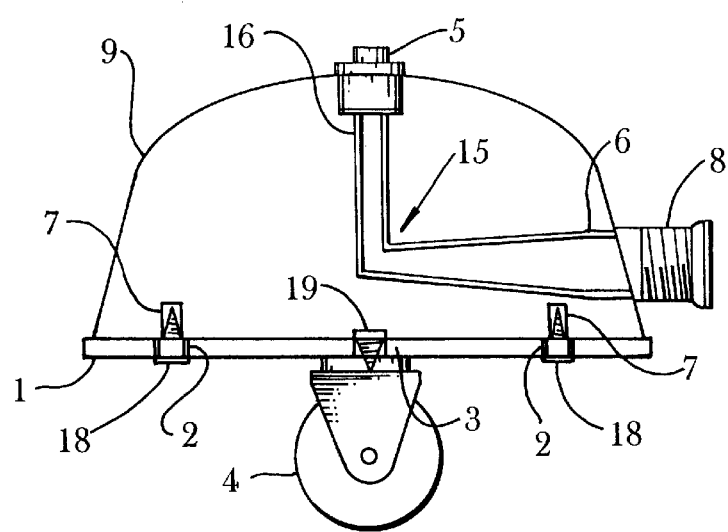
FIG. 5 is a side cut-away view of the body showing the interior construction of the body as is shown in FIG. 1

FIG. 2 shows the base plate which is attached to the body in FIG. 1. It should be constructed of a heavy material in order to add weight and stability to the body. Four holes are provided in order to pass attaching screws through the base plate 1 and secure it to the main body of the invention 9. At lease one, preferably two holes 3 in the base plate 1 allow for the attachment of casters 4 with screws 19 as shown in FIG. 3. This type of wheel allows for a full 360 degree travel pattern and would allow the operator to manipulate the body 9 via the attached water pipe 10 in any direction underneath the vehicle. FIG. 4 shows a view of the body of the invention featuring the integral connecting threads 6. FIG. 5 reveals a cross-sectional view showing the interior of the body 9 and featuring the tube-like structure 15 with its integral threaded ends 6 and 16. The diameter changes from approximately ¾ inch from the end of the water pipe attachment 6 to ¼ inch diameter at the nozzle attachment end 16. A metal or plastic nozzle 5, which has an approximate diameter of ½ /inch, is fitted into the threaded opening 16 allowing for a water spray pattern to be developed. As the nozzle is detachable, this feature allows for changing nozzles for various spray patterns and volumes of water release or for replacement in the case of failure. The tapered tube like structure 15 allows for greater concentration of water pressure at the nozzle end of the tube. Also as shown in FIG. 5, provision is made for threaded channels 7 to receive the attaching screws 18 that pass through the holes 2 in the base plate 1. By allowing for a removable base plate 1, it is a very simple matter to replace the caster 4 in the event of failure. As shown in FIG. 4 and 5, an integral thread 6 is provided in the tube-like structure 15 in order to connect the male portion of the connector 8 into the body 9. Not only does this allow for replacement of the connector 8 in the event of failure, but also all of the tightening stress of the connection from the connector 8 to the water pipe 10 is isolated from the main body 9, allowing for extension of service life for the main body 9.

A slight dome shape is apparent to the top of the body 9, as shown in FIGS. 1, 4 and 5. This allows for water deflection away from the body 9 when the spray water bounces back after hitting the undercarriage surfaces. This feature is important due to the fact that contaminants (mud, salt, etc.) could collect on the top of the body 9 and eventually clog the nozzle.

As various changes can be made in the above constructions without departing from the scope of the invention, it is intended that all matter contained in the above description or shown in the accompanying drawings shall be interpreted as illustrative and not in a limited sense.

I claim:

1. A vehicle undercarriage washing/cleaning device comprising:

a. a first element comprising a main body to which is attached a substantially horizontal water pipe connection and a substantially vertical water dispensing spray nozzle the both of which are connected within the body by a hollow tube-like structure which has a diameter varying from about ¾ inch to about ¼ inch, the said tube-like structure having a right angle from the horizontal position of the water pipe connection to the vertical position of the water dispensing nozzle, the body having a removable base plate attached by screws and, further, having attached thereunto at least one caster; the top of the body slightly domed in shape whereby water and debris are deflected away from the top and nozzle area, and b. a second element comprising a water pipe of about ¾ inches in diameter made from a rigid, non-flexible material, and adapted to connect to said water pipe connection at one end and adapted for connection at the other end to a water source and fabricated in at least one section and further comprises a horizontal path of travel, perpendicular from the main body for a length of about 20 inches and thence via a gentle bend of about 45 to about 55 degrees to a further length of about 30 inches, there being a valve control device attached to the water pipe, and adapted to be connected to said water source whereby an operator has full control of the volume of water from an attached source and by hand on the rigid non-flexible water pipe directs the main body along a horizontal plane parallel to the undercarriage of a wheeled vehicle to deliver a cleaning stream of water thereto.

2. The vehicle undercarriage washing/cleaning device of claim 1 wherein said attached water source is a garden-type hose.

3. The vehicle undercarriage washing/cleaning device of claim 1 wherein said water pipe is fabricated in more than one section and said sections are joined by a compression fitting whereby said device can be dissembled with ease into its component parts for storage or replacement of damaged parts.

4. The vehicle undercarriage washing/cleaning device of claim 1 wherein said nozzle is detachable whereby various spray patterns and water release volumes readily can be provided by changing nozzles.

* * * * *